(12) United States Patent
Hori

(10) Patent No.: US 10,828,957 B2
(45) Date of Patent: Nov. 10, 2020

(54) VEHICLE SYSTEM, VEHICLE, AND INFORMATION PROCESSING DEVICE

(71) Applicant: TOYOTA JIDOSHA KABUSHIKI KAISHA, Toyota (JP)

(72) Inventor: Takashige Hori, Aisai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 162 days.

(21) Appl. No.: 16/210,639

(22) Filed: Dec. 5, 2018

(65) Prior Publication Data
US 2019/0176570 A1 Jun. 13, 2019

(30) Foreign Application Priority Data

Dec. 8, 2017 (JP) .................................. 2017-235849

(51) Int. Cl.
*B60H 1/00* (2006.01)
*G07C 5/00* (2006.01)

(52) U.S. Cl.
CPC ..... *B60H 1/00657* (2013.01); *B60H 1/00778* (2013.01); *B60H 1/00807* (2013.01); *G07C 5/008* (2013.01)

(58) Field of Classification Search
CPC ............ B60H 1/00657; B60H 1/00778; B60H 1/00807; G07C 5/008
See application file for complete search history.

(56) References Cited

U.S. PATENT DOCUMENTS

| 7,348,880 | B2 * | 3/2008 | Hules | .................. B60R 25/1004 340/425.5 |
| 2002/0161501 | A1 * | 10/2002 | Dulin | ................. B60H 1/00814 701/45 |
| 2016/0200219 | A1 * | 7/2016 | Tjahjono | ............... G01S 5/0027 340/457 |
| 2016/0368345 | A1 * | 12/2016 | Farooq | ............... B60H 1/00771 |
| 2017/0046957 | A1 * | 2/2017 | Jordens | .................. G08G 1/145 |
| 2018/0195911 | A1 * | 7/2018 | Kakade | ................ B60H 1/0075 |

FOREIGN PATENT DOCUMENTS

| JP | 2008-275491 A | 11/2008 |
| JP | 2011-122938 A | 6/2011 |
| JP | 2013-246120 A | 12/2013 |

* cited by examiner

*Primary Examiner* — Rodney A Butler
(74) *Attorney, Agent, or Firm* — Hunton Andrews Kurth LLP

(57) ABSTRACT

A vehicle system includes: an information processing device; and a vehicle including a first processor configured to detect an inside vehicle cabin temperature in association with time information, at times of starting and stopping of the vehicle. The information processing device includes a second processor configured to: receive, from the vehicle, the inside vehicle cabin temperature, the time information, and the positional information; calculate, for a parking section corresponding to the positional information, a probability of a rise in the inside vehicle cabin temperature in the parking section, by learning the inside vehicle cabin temperature and the time information at the time of the starting and the time of the stopping; and provide a service according to the probability of the rise in the inside vehicle cabin temperature to the vehicle.

12 Claims, 5 Drawing Sheets

VEHICLE SYSTEM, VEHICLE, AND INFORMATION PROCESSING DEVICE

INCORPORATION BY REFERENCE

The disclosure of Japanese Patent Application No. 2017-235849 filed on Dec. 8, 2017 including the specification, drawings and abstract is incorporated herein by reference in its entirety.

BACKGROUND

1. Technical Field

The disclosure relates to a vehicle system, a vehicle, and an information processing device.

2. Description of Related Art

In a case of parking a vehicle in a parking lot or the like, in general, parking in a shaded area is desired since parking in a sunny area raises a temperature inside the vehicle.

In Japanese Unexamined Patent Application Publication No. 2011-122938 (JP 2011-122938 A), a method of figuring out a shaded area occurring in a parking section during a parking period from a start date and time of a parking based on positional information of the sun and map information including parking lot information showing a shape or a position of each parking section of a parking lot and building information showing a shape and a position of a building existing around the parking lot and determining a parking position to recommend is disclosed.

SUMMARY

As described above, in the method disclosed in JP 2011-122938 A, the information on the shape of the building around the parking section or the like is needed, but it is not easy to acquire such information described above. Even when it is possible to acquire the information on the building around, a suitable figuring out is not available when there is a construction, demolition, extension and remodeling of the building.

Several aspects of the disclosure provide a vehicle system, a vehicle, and an information processing device that can suitably provide a service according to a probability of change of an inside vehicle cabin temperature.

A first aspect of the disclosure provides a vehicle system. The vehicle system includes an information processing device and a vehicle. The vehicle includes a first processor configured to detect an inside vehicle cabin temperature, the inside vehicle cabin temperature being a temperature inside vehicle cabin of the vehicle, in association with time information, at a time of starting of the vehicle and at a time of stopping of the vehicle, acquire positional information of the vehicle at either or both of the time of the starting and the time of the stopping, and transmit, to the information processing device, the inside vehicle cabin temperature, the time information, and the positional information at the time of the starting and the time of the stopping. The information processing device includes a second processor configured to receive, from the vehicle, the inside vehicle cabin temperature, the time information, and the positional information at the time of the starting and the time of the stopping, calculate, for a parking section corresponding to the positional information, a probability of a rise in the inside vehicle cabin temperature in the parking section, by learning the inside vehicle cabin temperature and the time information at the time of the starting and the time of the stopping, and provide a service according to the probability of the rise in the inside vehicle cabin temperature to the vehicle.

A second aspect of the disclosure provides a vehicle. The vehicle includes processor configured to: detect an inside vehicle cabin temperature, the inside vehicle cabin temperature being a temperature inside vehicle cabin of the vehicle, in association with time information, at a time of starting of the vehicle and at a time of stopping of the vehicle; acquire positional information of the vehicle at either or both of the time of the starting and the time of the stopping; transmit, to an information processing device, the inside vehicle cabin temperature, the time information, and the positional information at the time of the starting and the time of the stopping; and receive, from the information processing device, information on a service according to a probability of a rise in the inside vehicle cabin temperature in a parking section corresponding to the positional information, the probability being calculated based on the inside vehicle cabin temperature and the time information at the time of the starting and the time of the stopping.

A third aspect of the disclosure provides an information processing device. The information processing device includes a processor configured to: receive, from a vehicle, an inside vehicle cabin temperature, the inside vehicle cabin temperature being a temperature inside vehicle cabin of the vehicle, time information, and positional information of the vehicle, at a time of starting of the vehicle and at a time of stopping of the vehicle; calculate, for a parking section corresponding to the positional information, a probability of a rise in the inside vehicle cabin temperature in the parking section, by learning the inside vehicle cabin temperature and the time information at the time of the starting and the time of the stopping; and provide a service according to the probability of the rise in the inside vehicle cabin temperature to the vehicle.

In the aspects of the disclosure, a "unit", a "device", or a "system" does not simply mean physical means and also includes a case where a function of the "unit", the "device", or the "system" is realized by software. The function of one "unit", one "device", one "system", or the like may be realized by two or more physical means or devices, functions of two or more "units", "devices", "systems", or the like may be realized by one physical means or device.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
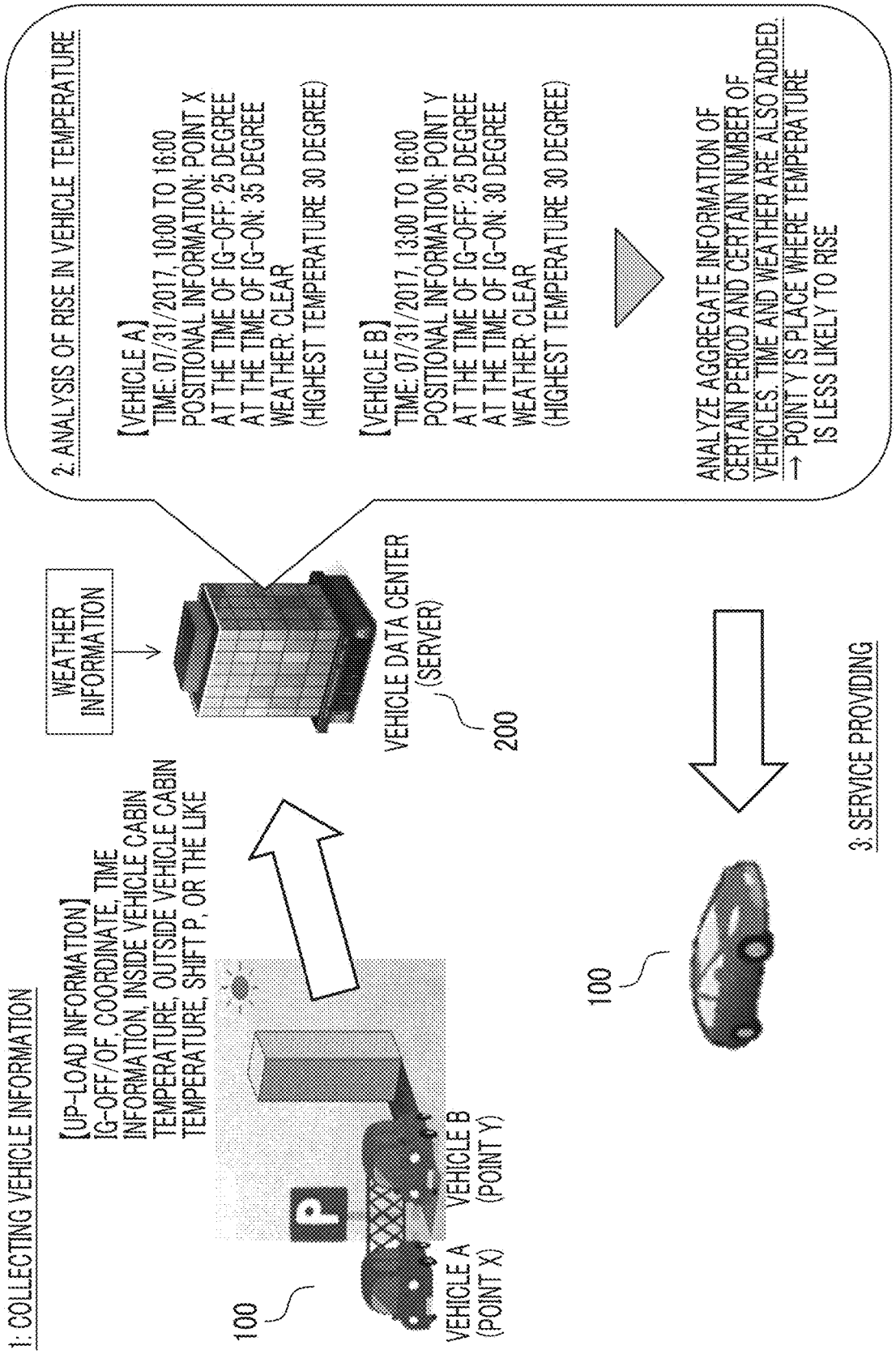
FIG. 1 is a diagram for describing an operation of a vehicle system according to an embodiment.

Hereinafter, an embodiment of the disclosure will be described with reference to drawings. However, the embodiment described below is merely an example, and there is no intention to exclude an application of various modifications and techniques not explicitly described below. That is, the disclosure can be implemented with various modifications without departing from the scope and the spirit of the disclosure. In the following description of the drawings, the same or similar parts are denoted by the same or similar reference numerals. The drawings are schematic and do not necessarily correspond to actual dimensions, ratios, and the like. The relationships and ratios of dimensions in the drawings may be different from each other.

Embodiment

1 Overall Configuration

An operation of a vehicle system 1 according to the embodiment will be described with reference to FIG. 1. The vehicle system 1 includes one or more vehicles 100 and a vehicle data center (a server) 200, and the vehicle 100 and the vehicle data center (the server) 200 can mutually communicate via a network such as a public telephone network or the Internet.

When the vehicle 100 is parked in a parking lot and a manipulation of stopping an energization (Ignition (IG)-OFF) is performed, the vehicle 100 detects a position of a host vehicle (coordinate information corresponding to a position of a parking section where a vehicle is parked), an inside vehicle cabin temperature (a temperature inside a vehicle cabin of the host vehicle), and an outside vehicle cabin temperature (a temperature outside a vehicle cabin of the host vehicle) and transmits, to the server 200, the described above information together with a fact that the stopping manipulation (IG-OFF) has been performed, the position of the host vehicle, time information, or the like (hereinafter the above-described information is also referred to as vehicle information). Similarly, when a manipulation (IG-ON) of starting the vehicle 100 is performed in the parking lot, the vehicle 100 detects the position of the host vehicle, the inside vehicle cabin temperature, and the outside vehicle cabin temperature and transmits, to the server 200, the information described above together with a fact that the starting manipulation (IG-ON) has been performed, the position of the host vehicle, the time information, or the like.

Upon reception of information of the position of the vehicle (the position of the parking section), the time information, the inside vehicle cabin temperature, and the outside vehicle cabin temperature from the vehicle 100, the server 200 sequentially records the above-described information in a database (hereinafter, simply referred to as a "DB"). It is possible to specify a degree and a time slot of a temperature rise in a vehicle cabin in a parking section by comparing temperatures inside the vehicle cabin between a time of starting the vehicle and a time of stopping the vehicle, in the same vehicle and the same parking section. The server 200 acquires weather information in an area of the parking section from a weather information providing service or the like. The server 200 can statistically learn a probability of a rise in the temperature of the vehicle cabin according to an outside temperature condition (the outside vehicle cabin temperature), a weather condition, and the time slot for each parking section by collecting pieces of the information for a certain period of time.

The server 200 provides various services to the vehicle 100 according to the probability of a rise in the inside vehicle cabin temperature for each parking section which is statistically learned as described above. For example, in a car navigation service, the server 200 may guide the vehicle to a parking section in which the inside vehicle cabin temperature is less likely to rise. Since the parking section where the inside vehicle cabin temperature is more likely to rise is considered to have been in a sunny area for a long time, in a case of the vehicle 100 equipped with a solar panel, the server 200 may guide the vehicle to the parking section where the inside vehicle cabin temperature is more likely to rise.

Alternatively, in a case where the vehicle 100 is equipped with a remote air conditioner function of activating an air conditioner using a mobile phone or the like, a proposal may be made to a user regarding when to activate the air conditioner and how to set the temperature, or the like, according to the probability of a rise in the inside vehicle cabin temperature of the parking section in which the vehicle 100 is parked.

2 Functional Configuration

Figure 2:
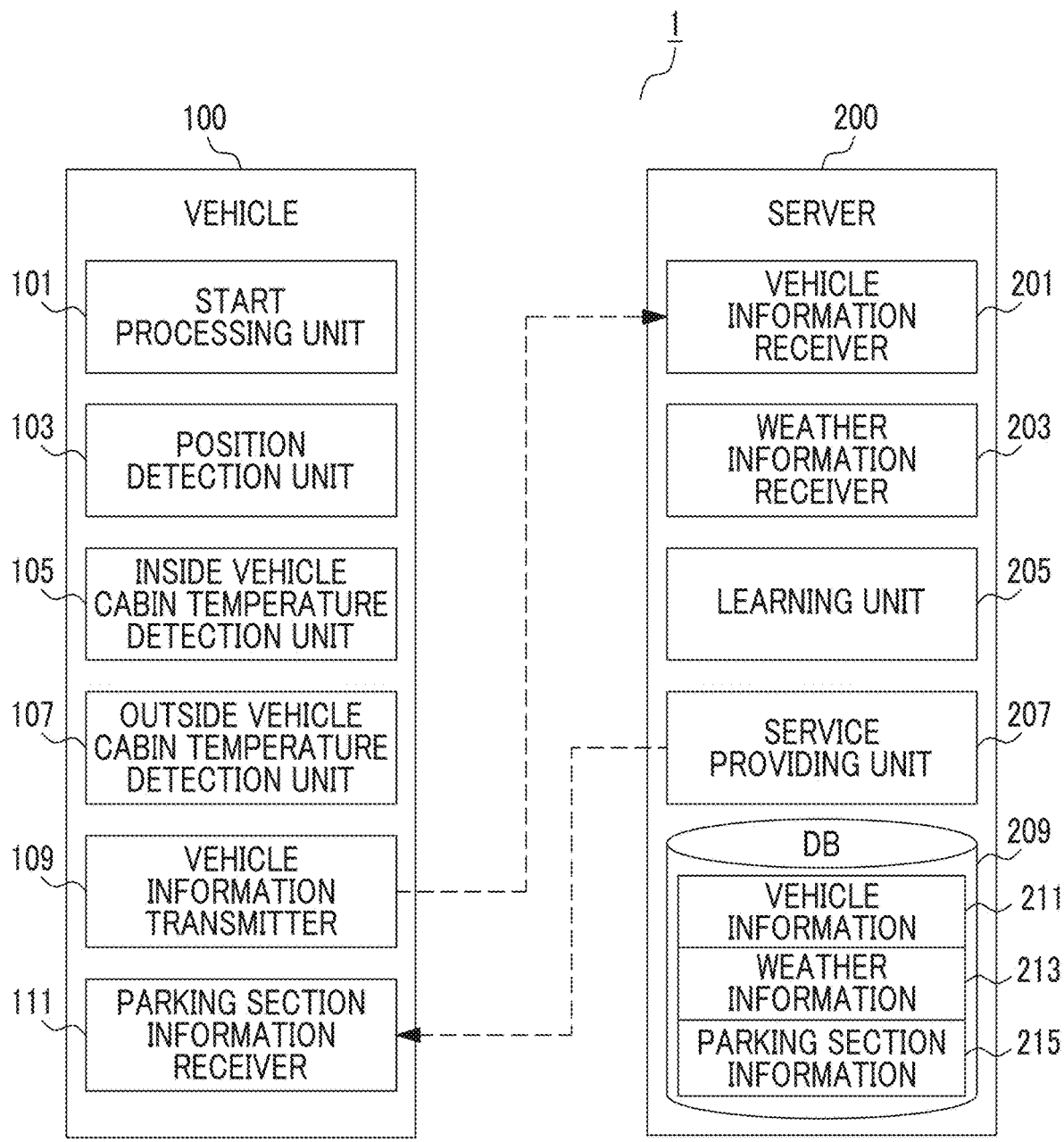
FIG. 2 is a block diagram showing a functional configuration of the vehicle system according to the embodiment.

The functional configuration of the vehicle system 1 according to the embodiment will be described with reference to FIG. 2. As described above, the vehicle system 1 includes the one or more vehicles 100 and the server 200 (a single vehicle 100 is shown in FIG. 2). The vehicle 100 and the server 200 can mutually communicate via a network (not shown) such as the Internet or the public telephone network.

2.1 Vehicle 100

The vehicle 100 includes a start processing unit 101, a position detection unit 103, an inside vehicle cabin temperature detection unit 105, an outside vehicle cabin temperature detection unit 107, a vehicle information transmitter 109, and a parking section information receiver 111. The function of each unit can be realized by a computer 500 described later.

When the user performs a manipulation to make the vehicle 100 be in an energized state (for example, pressing a power button, key manipulation, or the like to start the vehicle), the start processing unit 101 performs a start processing (IG-ON) to make the vehicle 100 be in the energized state.

The position detection unit 103 receives traveling information after specifying of the position, or the like by using a global positioning system (GPS) or Wi-Fi, and acquires positional information (latitude and longitude information as the coordinate information) of the host vehicle. After the vehicle 100 is started, the position detection unit 103 periodically acquires the positional information for use in the so-called car navigation service or the like. As described above, at the times of stopping operation and starting operation of the vehicle 100, the position detection unit 103 detects the positional information of the vehicle 100 relating to a stopping point. Since the positions of the vehicle 100 at the times of stopping operation of the vehicle 100 and starting operation of the vehicle 100 are usually the same, information relating to either position may be detected.

The inside vehicle cabin temperature detection unit 105 and the outside vehicle cabin temperature detection unit 107 respectively detect the temperature inside and outside the vehicle cabin of the vehicle 100. The temperature inside and outside the vehicle cabin can be used, for example, for controlling the air conditioner. In the vehicle system 1 according to the embodiment, at least the times of starting and stopping the vehicle 100, the temperatures inside and outside the vehicle cabin are detected.

The vehicle information transmitter 109 transmits the information of the host vehicle to the server 200 as the vehicle information at either or both of the times of starting and stopping the vehicle. The vehicle information to be transmitted to the server 200 may include information indicating a state of the host vehicle as to whether the vehicle is started or stopped, the positional information (the coordinate information), the time information, the inside vehicle cabin temperature, the outside vehicle cabin temperature, or the like.

The parking section information receiver 111 receives a service provided according to the probability of a rise in the inside vehicle cabin temperature of the parking section from the server 200. Specifically, for example, in the car navigation service, the information of the parking section in which the inside vehicle cabin temperature is more likely to rise, or less likely to rise, is received from the server 200.

2.2 Server 200

The server 200 includes a vehicle information receiver 201, a weather information acquisition unit 203, a learning unit 205, a service providing unit 207, and a DB 209.

The vehicle information receiver 201 receives vehicle information 211 at the times of starting and stopping the vehicle 100 from the vehicle information transmitter 109 of the vehicle 100. As described above, the vehicle information 211 can include the state of the vehicle 100 (at the times of starting and stopping the vehicle), the positional information (the positional information of the parking section in which the vehicle 100 is parked), the time information, the inside vehicle cabin temperature, the outside vehicle cabin temperature, or the like. The vehicle information receiver 201 stores the received vehicle information 211 in the DB 209.

The weather information acquisition unit 203 acquires weather information 213 corresponding to the time information and position included in the vehicle information 211 received by the vehicle information receiver 201, with respect to the vehicle information 211, for example, from a weather information providing service or the like. The weather information acquisition unit 203 stores the acquired weather information 213 in the DB 209 together with the vehicle information 211.

The learning unit 205 statistically learns the probability of a rise in the inside vehicle cabin temperature according to the time information, the weather, and the outside vehicle cabin temperature in each parking section based on the vehicle information 211 and the weather information 213 stored in the DB 209. Information of the probability of a rise in the inside vehicle cabin temperature of each parking section which is obtained as a result of the learning is stored in the DB 209 as parking section information 215.

The service providing unit 207 provides, to the one or more vehicles 100, the service according to the parking section information 215 which is information of the probability of a rise in the inside vehicle cabin temperature of each parking section which is obtained by the learning unit 205. Examples of the service provided by the service providing unit 207 can include a guidance to a parking section where the inside vehicle cabin temperature is less likely to rise, a guidance to a parking section where the inside vehicle cabin temperature is more likely to rise (which is presumed to have been the sunny area for a long time), a proposal of setting the air conditioner according to the probability of a rise in the inside vehicle cabin temperature of the vehicle 100 in the parking section, or the like. The DB 209 stores various information including the vehicle information 211, the weather information 213, and the parking section information 215.

3 Process Flow

Figure 3:
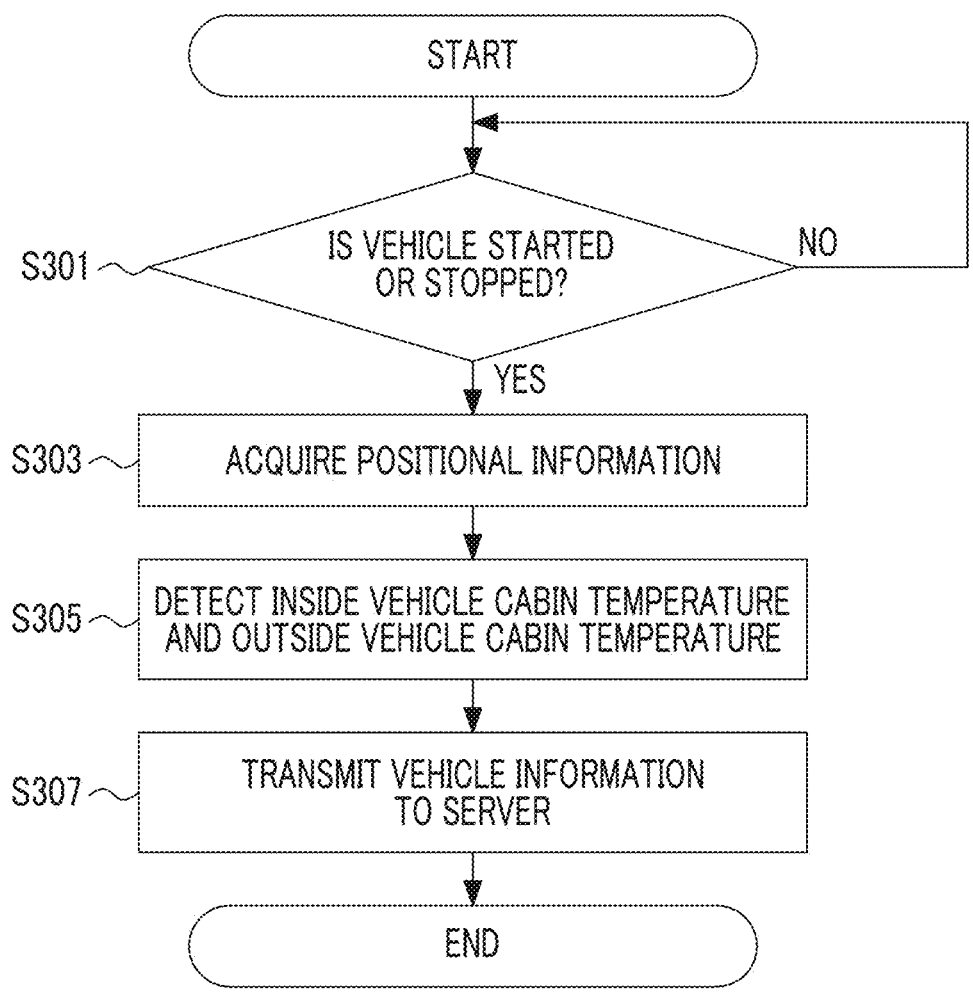
FIG. 3 is a flowchart showing a processing flow of a vehicle.
Figure 4:
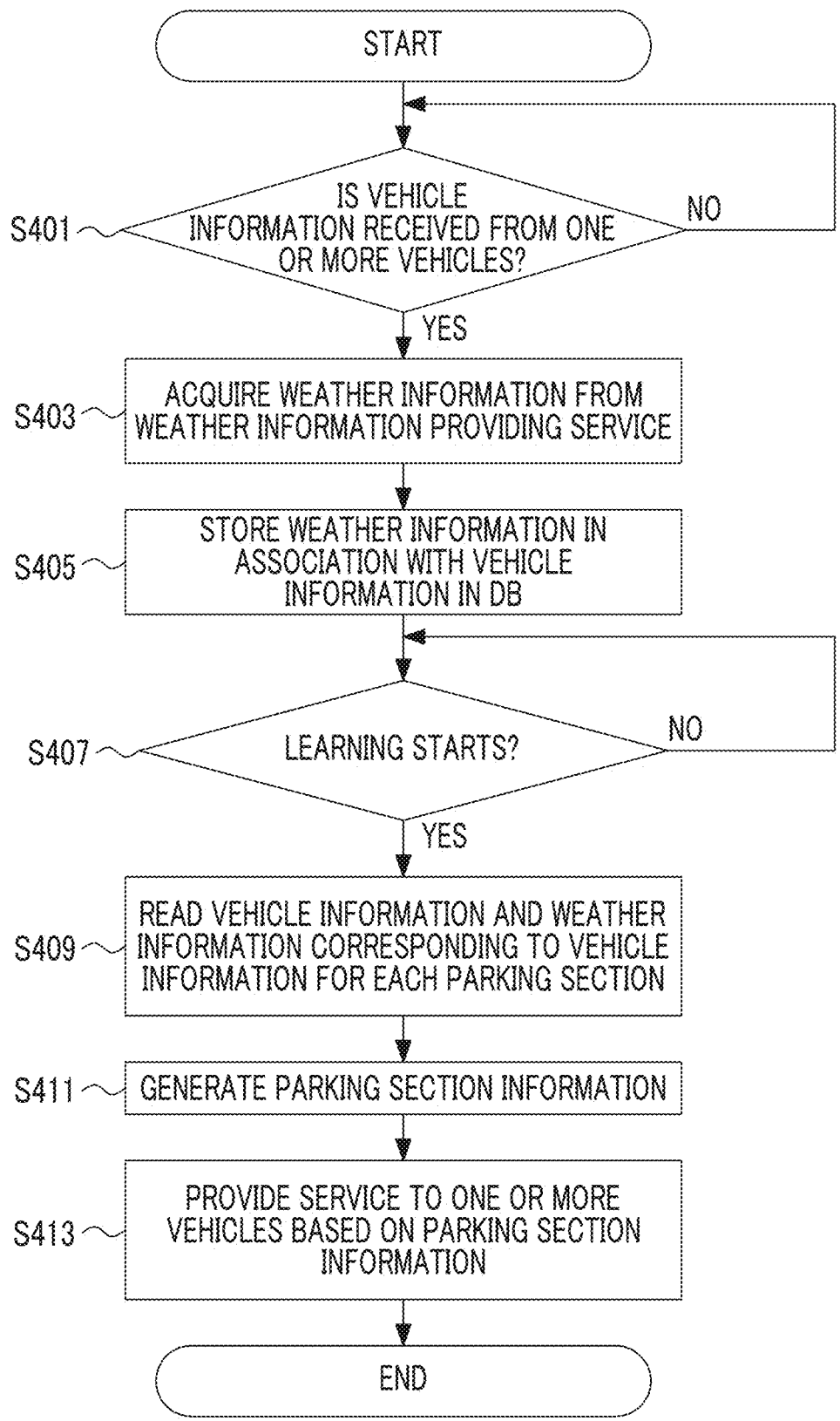
FIG. 4 is a flowchart showing a processing flow of a server.

Hereinafter, the processing flow of the vehicle system 1 will be described with reference to FIGS. 3 and 4. FIGS. 3 and 4 are flowcharts showing the processing flow of the vehicle 100 and the server 200 constituting the vehicle system 1.

In each processing step to be described later, order can be optionally changed and execution in parallel is possible within a range not causing inconsistency in processing contents, and other steps may be added between respective processing steps. A single step for convenience of a description can also be executed by being divided into a plurality of steps, and a plurality of steps divided for the convenience of the description can be also executed as a single step.

3.1 Processing Flow of Vehicle 100

When the user performs the manipulation of starting or stopping the vehicle 100 (for example, pressing the power button, the key manipulation, or the like) (Yes in S301), the position detection unit 103 acquires a current position of the host vehicle, that is, the coordinate information (the latitude and longitude information) of the parking section where the host vehicle is parked (S303). The inside vehicle cabin temperature detection unit 105 and the outside vehicle cabin temperature detection unit 107 respectively detect the temperatures inside and outside the vehicle cabin (S305).

The vehicle information transmitter 109 transmits, to the server 200, the vehicle information including the state, the positional information, the time information, the inside vehicle cabin temperature, and the outside vehicle cabin temperature of the host vehicle relating to either the starting or the stopping (S307).

3.2 Processing Flow of Server 200

The processing flow of the server 200 will be described with reference to FIG. 4.

Upon receiving the vehicle information 211 from the one or more vehicles 100 (S401), the vehicle information receiver 201 of the server 200 stores the vehicle information 211 in the DB 209 as needed. The weather information acquisition unit 203 acquires the corresponding weather information 213 (that is, the information on the weather at the parking area and the time for which the vehicle 100 has detected the temperatures inside and outside of the vehicle cabin) from the weather information providing service based on the positional information and the time information included in the received vehicle information 211 (S403). The weather information 213 is stored in the DB 209 in association with the vehicle information 211 (S405).

As statistical learning is started regarding the probability of a rise in the inside vehicle cabin temperature according to the time information, the weather, and the outside vehicle cabin temperature in each parking section or the like (S407) based on the vehicle information 211 and the weather information 213 stored in the DB 209, the learning unit 205 reads the vehicle information 211 and the weather information 213 corresponding to the vehicle information 211 for each parking section at any timing (S409), and generates the parking section information 215 indicating the probability of a rise in the inside vehicle cabin temperature according to conditions such as the time information, the weather information, the outside vehicle cabin temperature, or the like (S411). The generated parking section information 215 is stored in the DB 209.

The service providing unit 207 provides the service to the one or more vehicles 100 based on the parking section information 215 (S413). Examples of the service provided by the service providing unit 207 to the vehicle 100 can include a guidance to the parking section where the inside vehicle cabin temperature is less likely to rise or a guidance to the parking section where the inside vehicle cabin temperature is more likely to rise (which is presumed to have been in the sunny area for a long time) in the car navigation service, and the proposal service for setting an air conditioner according to the probability of a rise in the inside vehicle cabin temperature of the vehicle 100 in the parking section.

4 Hardware Configuration

Figure 5:
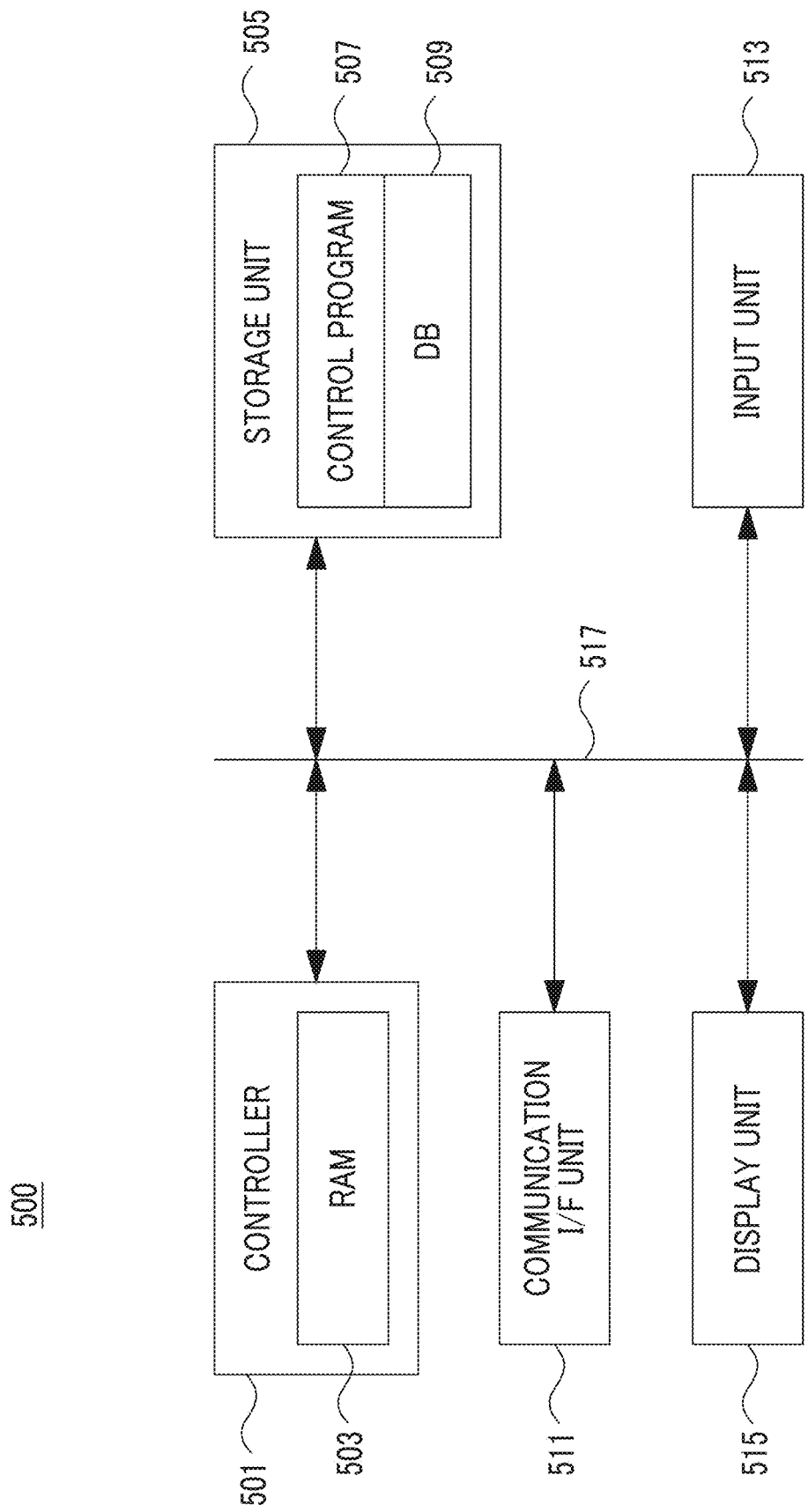
FIG. 5 is a block diagram showing a specific example of a hardware configuration capable of realizing the vehicle or the server shown in FIG. 2.

A hardware configuration of the computer 500 that can realize the vehicle 100 and the server 200 will be described with reference to FIG. 5. The computer 500 includes a controller 501, a storage unit 505, a communication interface (I/F) unit 511, an input unit 513, and a display unit 515, and each unit is connected via a bus line 517.

The controller 501 includes a central processing unit (CPU, not shown), a read only memory (ROM, not shown), a random access memory (RAM) 503, and the like. The controller 501 is configured to being capable of executing processing relating to the respective configurations of the vehicle 100 and the server 200 shown in FIG. 2 by executing a control program 507 stored in the storage unit 505 in addition to the function of a typical computer. For example, the start processing unit 101, the position detection unit 103, the inside vehicle cabin temperature detection unit 105, the outside vehicle cabin temperature detection unit 107, the vehicle information transmitter 109, and the parking section information receiver 111 of the vehicle 100 are temporarily stored in the RAM 503 to be realized using the control program 507 operating on the CPU. The same is applied to the vehicle information receiver 201, the weather information acquisition unit 203, the learning unit 205, and the service providing unit 207 of the server 200.

The RAM 503 temporarily stores a part or all of codes included in the control program 507 and the pieces of information included in a database (DB) 509. The RAM 503 is also used as a work area when the CPU executes the various processing.

The storage unit 505 is a nonvolatile storage medium such as a hard disk drive (HDD) and a flash memory. The storage unit 505 stores an operating system (OS) for realizing a function as the typical computer and the control program 507 as an application program. When the server 200 is to be realized by the computer 500, the storage unit 505 stores the DB 509 corresponding to the DB 209.

The communication I/F unit 511 is a device to perform data communication between the vehicle 100 and the server 200 as needed. Any communication method may be used between the vehicle 100 and the server 200, and examples thereof can include the public telephone network, the Internet, and a combination of the public telephone network and the Internet are considered.

The input unit 513 is a device that receives an input manipulation from the user. Specific examples of the input unit 513 can include various buttons, a touch panel, a microphone, or the like.

The display unit 515 is a display device that presents various information to the user manipulating the computer 500. Specific examples of the display unit 515 can include a liquid crystal display, and an organic electro-luminescence (EL) display.

5 Effect of Embodiment

As described above, in the vehicle system 1 according to the embodiment, the parking section in the shaded area (the temperature is less likely to rise) or in the sunny area (the temperature is more likely to rise) is specified based on the degree of temperature rise during the parking period using the temperatures inside and outside the vehicle cabin according to the parking section uploaded from the one or more vehicles 100. Accordingly, it is possible to specify the probability of whether the temperature of each parking section is more likely to rise or less likely to rise without any information such as the information on building around. It is possible for the server 200 to provide the various services according to the probability of whether the temperature is more likely to rise or less likely to rise.

6 Appendix

The above-described embodiment is intended to facilitate understanding of the disclosure and is not intended to limit the disclosure. Each element of the embodiment, a disposition thereof, a material, a condition, a shape, a size, and the like are not limited to those exemplified and can be appropriately changed. It is possible to partially substitute or combine the configurations shown in different embodiments.

What is claimed is:

1. A vehicle system comprising:
an information processing device; and
a vehicle including
a first processor configured to
detect an inside vehicle cabin temperature, the inside vehicle cabin temperature being a temperature inside vehicle cabin of the vehicle, in association with time information, at a time of starting of the vehicle and at a time of stopping of the vehicle,
acquire positional information of the vehicle at either or both of the time of the starting and the time of the stopping, and
transmit, to the information processing device, the inside vehicle cabin temperature, the time information, and the positional information at the time of the starting and the time of the stopping,
wherein the information processing device includes
a second processor configured to
receive, from the vehicle, the inside vehicle cabin temperature, the time information, and the positional information at the time of the starting and the time of the stopping,
calculate, for a parking section corresponding to the positional information, a probability of a rise in the inside vehicle cabin temperature in the parking section, by learning the inside vehicle cabin temperature and the time information at the time of the starting and the time of the stopping, and
provide a service according to the probability of the rise in the inside vehicle cabin temperature to the vehicle.

2. The vehicle system according to claim 1, wherein:
the first processor is configured to detect an outside vehicle cabin temperature, the outside vehicle cabin temperature being a temperature outside vehicle cabin of the vehicle, in association with the time information, at the time of the starting and the time of the stopping;

the first processor is configured to transmit, to the information processing device, the inside vehicle cabin temperature, the outside vehicle cabin temperature, the time information, and the positional information at the time of the starting and the time of the stopping;

the second processor is configured to receive, from the vehicle, the inside vehicle cabin temperature, the outside vehicle cabin temperature, the time information, the positional information at the time of the starting and the time of the stopping; and the second processor is configured to learn information including the inside vehicle cabin temperature, the outside vehicle cabin temperature, and the time information at the time of the starting and the time of the stopping.

3. The vehicle system according to claim 1, wherein:

the second processor is configured to acquire weather information corresponding to the time information and the positional information; and the second processor is configured to learn the inside vehicle cabin temperature, the weather information, and the time information at the time of the starting and the time of the stopping.

4. The vehicle system according to claim 1, wherein the second processor is configured to transmit, to the vehicle, information of a parking section in which the inside vehicle cabin temperature is determined to be less likely to rise or determined to be more likely to rise by the second processor, based on the probability of the rise in the inside vehicle cabin temperature.

5. The vehicle system according to claim 1, wherein the second processor is configured to make a proposal relating to an air conditioner control for controlling the inside vehicle cabin temperature.

6. A vehicle comprising
a processor configured to:
detect an inside vehicle cabin temperature, the inside vehicle cabin temperature being a temperature inside vehicle cabin of the vehicle, in association with time information, at a time of starting of the vehicle and at a time of stopping of the vehicle;
acquire positional information of the vehicle at either or both of the time of the starting and the time of the stopping;
transmit, to an information processing device, the inside vehicle cabin temperature, the time information, and the positional information at the time of the starting and the time of the stopping; and
receive, from the information processing device, information on a service according to a probability of a rise in the inside vehicle cabin temperature in a parking section corresponding to the positional information, the probability being calculated based on the inside vehicle cabin temperature and the time information at the time of the starting and the time of the stopping.

7. The vehicle according to claim 6, wherein the processor is configured to detect an outside vehicle cabin temperature, the outside vehicle cabin temperature being a temperature outside vehicle cabin of the vehicle, in association with the time information, at the time of the starting and the time of the stopping.

8. The vehicle according to claim 6, wherein the processor is configured to receive a proposal relating to an air conditioner control for controlling the inside vehicle cabin temperature.

9. An information processing device comprising
a processor configured to:
receive, from a vehicle, an inside vehicle cabin temperature, the inside vehicle cabin temperature being a temperature inside vehicle cabin of the vehicle, time information, and positional information of the vehicle, at a time of starting of the vehicle and at a time of stopping of the vehicle;
calculate, for a parking section corresponding to the positional information, a probability of a rise in the inside vehicle cabin temperature in the parking section, by learning the inside vehicle cabin temperature and the time information at the time of the starting and the time of the stopping; and
provide a service according to the probability of the rise in the inside vehicle cabin temperature to the vehicle.

10. The information processing device according to claim 9, wherein:
the processor is configured to receive, from the vehicle, the inside vehicle cabin temperature, an outside vehicle cabin temperature, the outside vehicle cabin temperature being a temperature outside vehicle cabin of the vehicle, the time information, and the positional information at the time of the starting and the time of the stopping; and
the processor is configured to learn the inside vehicle cabin temperature, the outside vehicle cabin temperature, and the time information at the time of the starting and the time of the stopping.

11. The information processing device according to claim 9, wherein the processor is configured to acquire weather information corresponding to the time information and the positional information,
wherein the processor is configured to learn the inside vehicle cabin temperature, the weather information, and the time information at the time of the starting and the time of the stopping.

12. The information processing device according to claim 9, wherein the processor is configured to make a proposal relating to an air conditioner control for controlling the inside vehicle cabin temperature.

* * * * *